(No Model.) 3 Sheets—Sheet 1.
F. M. LEAVITT.
FRICTION CLUTCH AND ANALOGOUS DEVICES.
No. 581,292. Patented Apr. 27, 1897.
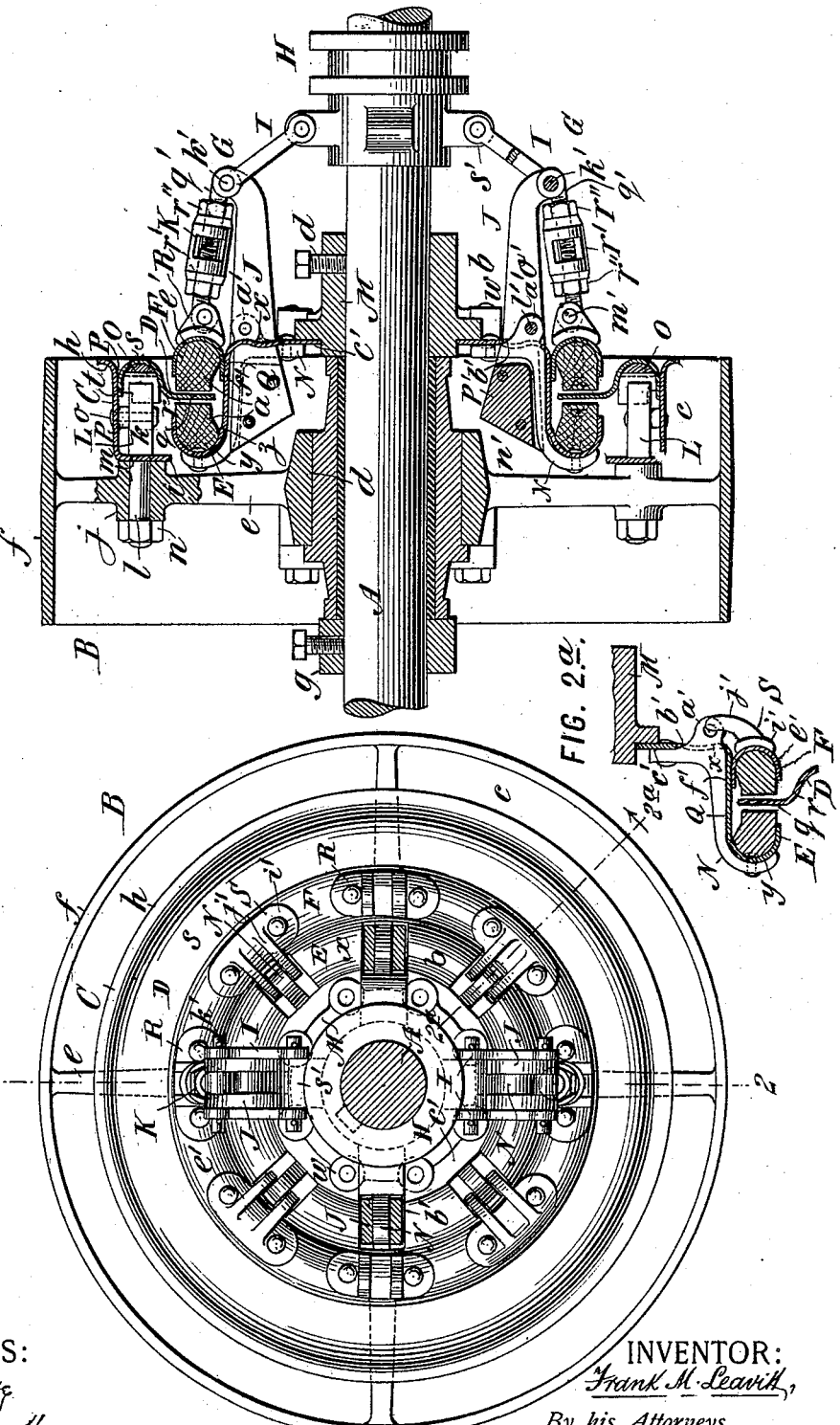
WITNESSES:
Fred White
Thomas F. Wallace
INVENTOR:
Frank M. Leavitt,
By his Attorneys,
Arthur G. Fraser & Co.

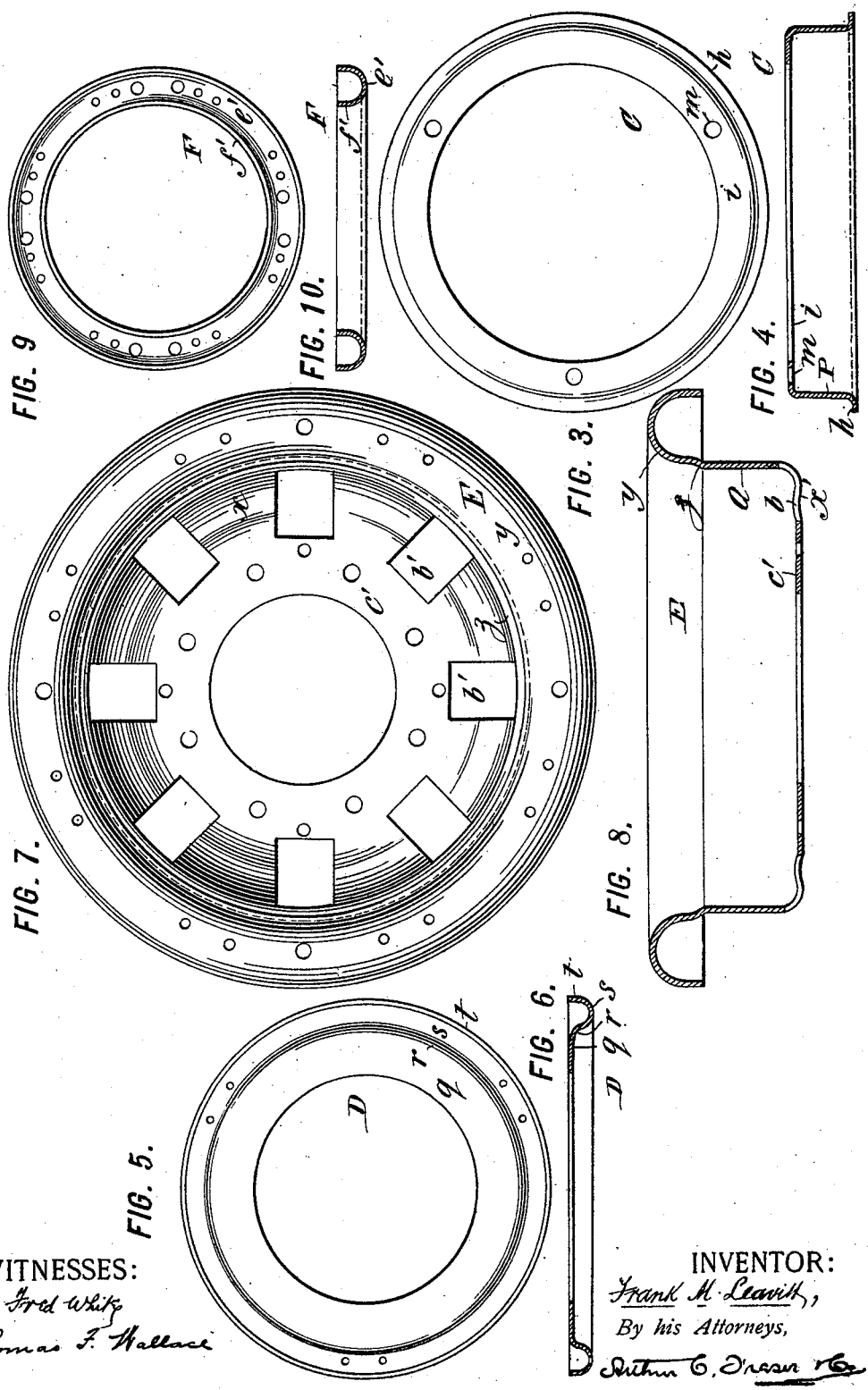

(No Model.) 3 Sheets—Sheet 3.

F. M. LEAVITT.
FRICTION CLUTCH AND ANALOGOUS DEVICES.

No. 581,292. Patented Apr. 27, 1897.

WITNESSES:
Fred White
Thomas F. Wallace

INVENTOR:
Frank M. Leavitt,
By his Attorneys,
Arthur E. Fraser

UNITED STATES PATENT OFFICE.

FRANK M. LEAVITT, OF BROOKLYN, NEW YORK, ASSIGNOR TO THE E. W. BLISS COMPANY, OF SAME PLACE.

FRICTION-CLUTCH AND ANALOGOUS DEVICES.

SPECIFICATION forming part of Letters Patent No. 581,292, dated April 27, 1897.

Application filed February 7, 1896. Serial No. 578,380. (No model.)

*To all whom it may concern:*

Be it known that I, FRANK M. LEAVITT, a citizen of the United States, residing in Brooklyn, in the county of Kings and State of New York, have invented certain new and useful Improvements in Friction-Clutches and Analogous Devices, of which the following is a specification.

This invention relates to friction-clutches and similar devices, and aims to provide certain improvements in such devices to the end of cheapening their construction, rendering them light in weight, and compact and convenient in form and improving their operation.

The invention is especially applicable to that well-known class of friction-clutches in which a friction-ring carried by one part and free for automatic lateral adjustment relatively thereto is embraced on its opposite faces by the friction-shoes of two clutching members, the one fixed to and the other movable on another part. Such members are caused to clutch such ring by a link-and-lever movement operated by a sliding sleeve. When the clutch members engage the ring, the two parts, one of which will be a driving and the other a driven part, are locked rotatively together, and when the members are freed from the ring the driving part can rotate independently of the driven part. The one part may be a pulley-wheel, shaft-coupling, or similar device adapted to carry the ring and the other part a shaft or other device to which the hub of the fixed member can be keyed or fixed and on which the operating-sleeve is movably mounted.

In carrying out my present invention in its preferred form I provide an improved inclosing and guiding flange for the clutch, an improved friction-ring within this flange, improved fixed and movable clutch members engaging this ring, improved operating mechanism between these members for moving them, and certain other features of improvement, which will be hereinafter fully set forth.

Figure 11:
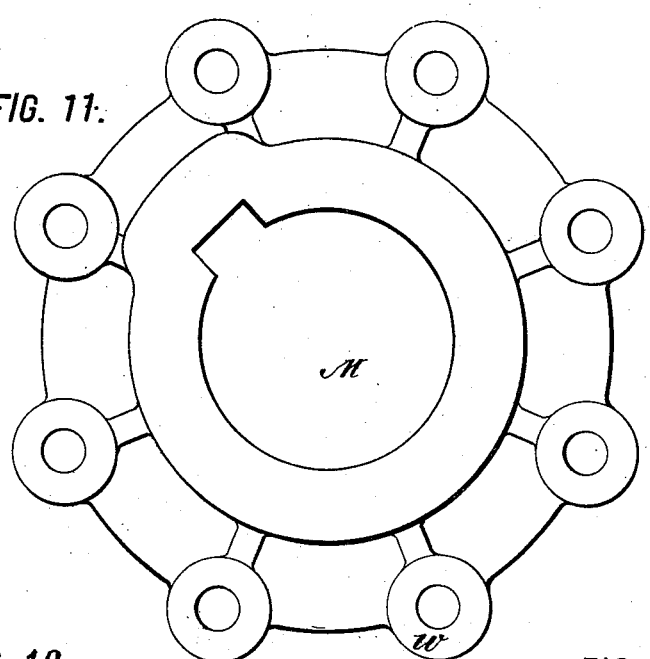
Figure 12:
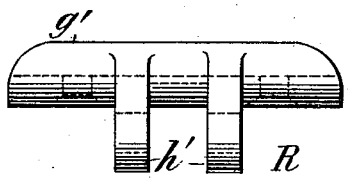
Figure 14:
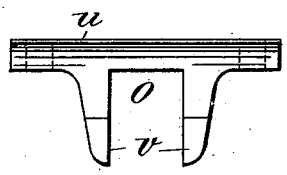
Figure 13:
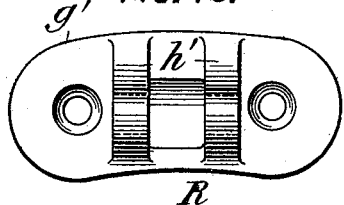
Figure 15:
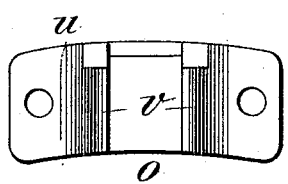
Figure 16:
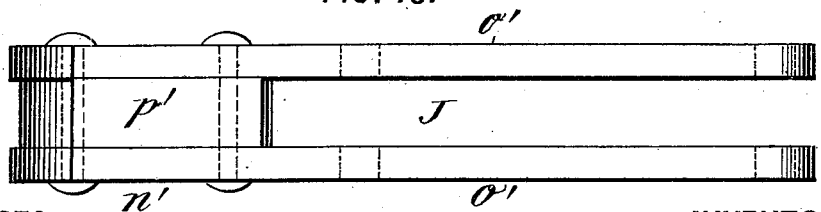

In the accompanying drawings, which show one adaptation of my invention, Figure 1 is a front elevation of a friction-clutch embodying the preferred form of my improvements. Fig. 2 is a vertical axial section thereof cut on the line 2 2 in Fig. 1, and Fig. 2$^a$ is a fragmentary section on the line 2$^a$ 2$^a$. Fig. 3 is a front elevation, and Fig. 4 an axial section, of the clutch-flange alone. Fig. 5 is a front elevation, and Fig. 6 an axial section, of the friction-ring. Fig. 7 is a front elevation, and Fig. 8 an axial section, of the fixed clutch-ring. Fig. 9 is a front elevation, and Fig. 10 an axial section, of the movable clutch-ring. Fig. 11 is an end elevation of the hub for the fixed ring. Fig. 12 is a plan, and Fig. 13 a face view, of the link-bracket for the movable ring. Fig. 14 is a plan, and Fig. 15 a face view, of the socket-piece for the friction-ring; and Fig. 16 is a plan view of one of the links. Figs. 11 to 16 show the same parts as illustrated in Figs. 1 and 2, but these parts are drawn to different scales in the different views for the sake of more clearly illustrating them individually.

Referring to the drawings, let A indicate a shaft, and B a pulley rotatively mounted thereon. Either of these may be the driving and the other the driven part, and either may be of any suitable or desired construction, so far as the purposes of my invention are concerned. For convenience we will designate the shaft as the "driving" and the pulley as the "driven" part. The driving part carries one member, $b$, of a friction-clutch and the driven part the other member, $c$, thereof. The member $b$ of the clutch is fixed on the shaft, as by a set-screw $d$, and bears in general a fixed relation to the member $c$ of the clutch, which is fixed to rotate with the part B. The part B (shown) consists of a pulley having a hub $d$, spokes $e$, and rim $f$. It is held on the shaft in fixed position axially by a collar $g$. The member $b$ of the clutch comprises a fixed clutch-ring E and a movable clutch-ring F, having opposing shoes $a$ for engaging the opposite faces of a friction-ring D, forming part of the member $c$ of the clutch and fixed rotatively to but adjustable laterally of the pulley B. These rings E and F are moved into and out of engagement with the ring D by operating-levers or other mechanism G, operated by a sliding grooved sleeve H, through the medium of links I, which sleeve is splined or otherwise mounted on the shaft, and when moved toward the hub M until its links I are at or slightly past the position of perpendicularity to its axis throws the clutch-rings E and F, through the medium of the mechanism G, into the active position, and when moved oppositely draws these rings into the inactive position. An internal flange C, inclosing the ring D, serves as a guide and reinforce for the latter.

As thus far described, the parts are, in their general features of construction and operation, of well-known principles, and in lieu thereof any known or suitable analogous devices can be substituted for those shown, if desired, without materially affecting my present improvements.

Referring to all the drawings, I will now describe in detail and in their preferred form the various features of improvement incident to this invention.

According to one feature of improvement I construct the clutch-flange C as a separate annular ring, of plate or sheet metal, as steel, iron, or other suitable material, stamped, pressed, or spun, and having a cylindrical inner guiding-face P, an outwardly bent and flaring outer edge $h$, and an inner flange $i$, which latter is fastened against bosses $j$ or other suitable portions, preferably formed on the spokes of the pulley, and is fixed thereon by pin-bolts L, the heads $k$ of which embrace the inner face of the flange $i$ and the tails $l$ of which traverse perforations $m$ through the flange and adjacent boss and are fixed in place by nuts $n$ or in any other suitable way. The heads $k$ of the pins L are preferably square in cross-section, extending forwardly toward the open side of the flange and are traversed by radial rivets $o$, near their outer ends, fastening them rigidly to the cylindrical part of the flange. To fill the space between this part and the head, small washers or collars $p$ are used.

The friction-ring D is also preferably constructed as a ring of stamped, pressed, or spun plate or sheet steel or iron or other suitable material, and has a wide portion $q$, which is flat and perpendicular to the axis of the clutch, opposite the shoes $a$, an outward bend $r$ beyond this portion, a wide, deep, and preferably semicircularly-bent portion $s$ between the bend $r$ and the flange C, and a cylindrical inwardly-extending flange $t$ beyond this portion, constituting the outer edge of the ring and fitting and sliding within the guide P of the flange to maintain the ring in position and permit it freedom of axial movement. Rotatively the ring D is coupled to the pulley by means of sockets formed in pieces O, which receive and embrace the projecting ends of the adjacent pins L. These sockets are of slightly greater width than the heads of the pins to give a slight freedom and are of sufficient depth to permit all desired lateral movement of the ring. The socket-pieces O are preferably drop-forgings, having a body $u$, curved longitudinally and laterally on one face to fit the part $s$ of the ring, to which they are riveted or otherwise suitably secured, and having projecting lugs $v$ for constituting the side walls of the socket into which the pin L passes. The outer edges of the lug $v$ are in part cut away to permit their inward movement as the ring D moves laterally into the flange C. The sockets O extend from the flange $t$ inwardly to the bend $r$.

The fixed clutch E consists of a disk of stamped, drawn, or pressed plate or sheet metal, fixed near its inner edge to the hub M, as by being riveted or otherwise attached to lugs $w$ thereon, extending thence outwardly beyond the hub in a curve $x$, which is at the outer side of the friction-ring D, then inwardly in a substantially cylindrical guide Q across the inner edge of the ring D, and then upwardly in a substantially semicircular bend $y$, opposite the inner face of the ring D. The inner side of the bend $y$ constitutes a shoe-groove and receives the wooden or other friction-shoes $a$ for the fixed clutch-ring, which shoes are fastened in the groove in any suitable manner, as by screws or otherwise. The guide portion Q of the clutch-ring E is disposed slightly inwardly of the adjacent bend $y$, this inset (shown at $z$) being preferably equal to the thickness of the metal of the ring. To reinforce the ring and to provide for fastening the mechanism G, I prefer to provide braces N, one of which is preferably used opposite each link mechanism G and suffices for the connection of the link J of this mechanism to the ring E, and between these braces are preferably substantially similar braces used for resisting relative rotative tendency of the ring F and the disk. The braces N are preferably drop-forgings corresponding substantially in shape to the shape of the inner face of the ring E and riveted to this face at their ends, one rivet being disposed near the center of the bend $y$ and the other near the hub M. Each brace has an outwardly-projecting eye $a'$, passing through a slot $b'$ in the outer wall $c'$ of the ring E.

The movable ring F consists simply of an annular grooved or U-shaped plate or sheet metal part, corresponding in its bent portion $e'$ to the bent portion $y$ of the ring E, opposed to this bent portion and receiving a corresponding wooden or other frictional shoe $a$, which is secured to it by screws or in any other suitable manner. The inner side or wall $f'$ of the ring F fits on the cylindrical guide Q of the ring E and slides thereon toward or from the friction-ring D. Where desired, brackets R are riveted on the ring F for connecting it to the mechanism G. These brackets are best constructed as drop-forgings, having curved and hollowed bodies $g'$, fitting the outer side of the ring F and perforated lugs $h'$, to which the link K is pivoted.

Between the brackets R at one or more points on the ring F are preferably fixed brackets S, which coact with the braces N, intermediate of the links J, to resist any tendency of the ring F to rotate relatively to the ring E. These brackets preferably have long curved bodies $i'$, fitting and riveted to the outer side of the ring F, and inwardly-extending lugs $j'$ embracing the opposite sides of the adjacent projection $a'$ of the corresponding brace N, which lugs slide outwardly and inwardly with the ring F at the sides of the brace during the ordinary movements of the ring, and by contact with the brace prevent rotative displacement of the ring. Any other suitable or desired arrangement of interengaging faces between the fixed and movable rings of the clutch member $b$ may be substituted for this particular arrangement.

The operating mechanism G for moving the ring F relatively to the ring E is best constructed, as shown, of a link J, pivoted to the fixed ring at its inner end, extending outwardly and pivoted to an adjustable link K at its outer end, the inner end of which link is pivoted to the movable ring. Any means, as for example, the sleeve H and sleeve-links I, are employed for operating the links J and K, being best connected to the latter at their pivoted outer ends. The outer ends of the links J, K, and I are shown as united by pivotal pins $k'$, the links J are pivoted to the braces N on pivotal pins $l'$, and the links K are pivoted to the ring F by pins $m'$ passing through the lugs of the brackets R. The links J and K are so disposed and proportioned that in the clutching operation the link J serves as a tension-link and the link K as a compression-link of a reversed toggle-joint, the operating-link I applying the force to these members of the joint at their outer ends in such manner as to throw the compression-link toward a position parallel to the direction of its thrust.

Each link J is extended inwardly of its pivot or fulcrum $l'$ in the form of a tail $n'$, which is within the guide Q of the fixed ring E and is proportioned preferably to more than counterbalance the centrifugal force of the outer portion of the link and of the links K and I, so that in rotation there will be no tendency toward centrifugal operation of the clutch. Each link J is best constructed of two flat separated metal bars $o'$, which may be blanked out of plate metal or formed of drop-forgings or in any other suitable manner, and which are separated to pass at the opposite sides of the brace N and maintain at the desired separation, and also weighted by metal blocks $p'$, riveted between their tails. These blocks fit beneath and inwardly of the brace. The pin $l'$ for each link passes through the eye $a'$ of the brace and through corresponding holes in the pieces $o'$, which pieces, from the block $p'$ outwardly, are not connected together, this construction permitting the removal of any link by drawing its inner end inwardly between the spokes of the pulley after the link has been disconnected from the other parts by removing the pivotal pins. Each link K preferably consists of oppositely-threaded eyebolts $q'$, adjustably connected together by a turn-nut $r'$ and suitable set-nuts $r''$. The eye of one bolt passes between the lugs of a bracket R and the eye of the other bolt passes between the ends of a link J. The links I are preferably double links, disposed one at one side and one at the other side of the link J, and the pins $k'$ pass through all these links, serving as pivotal studs for the three. At their other ends the links I are pivoted to the opposite sides of lugs $s'$ on the sleeve H.

The slots $b'$ in the front $c'$ of the ring E are of sufficient width to leave room for the outwardly-projecting portions of the links J at the sides of their braces N. The lugs $w$ on the hub M are best disposed at points intermediate of the braces. The body of the hub M is formed of sufficient thickness to permit the use of the same body for several sizes of shaft, so that it is merely necessary to fit the bore of the hub to the shaft, using in each instance the same size of hub, rings E, F, and D, and flange C. The flange C need not be modified for different-sized pulleys, but can be attached to a pulley of any size by disposing the bolt-holes $m$ in the pulley to coincide with the like holes in the flange. The clutch parts are made of sufficient strength to enable the use of the same parts for transmitting widely-varying degrees of power, so that the one size of clutch can be used under many differing conditions, it being only necessary to modify the bore of the hub and the construction of the pulley to meet the requirements of different uses.

In use with the construction shown when the clutch is inactive the fixed ring E and movable ring F will be sufficiently separated to permit a free space for the ring D between their shoes $a$. The ring will automatically assume an intermediate position between these shoes, so that its friction-faces $q$ will be out of contact therewith. In doing this the ring moves outward laterally in the guiding-flange C, by which flange it is maintained loosely in this position. The inner weighted ends of the links J are thrown outwardly by centrifugal force until their blocks $p'$ rest on the braces N, when the links are held stationary in the position shown. This movement of the links J holds the ring F in its outward position and resists any centrifugal tendency of the links K and I.

When the sleeve H moves inwardly, it straightens the links I and tilts the links J and K, moving the ring F against the friction-ring D and pressing the latter inwardly until its faces $q$ are properly grasped between the shoes $a$. This creates sufficient frictional engagement to drive the friction-ring with the clutch-rings, the driving force being transmitted by socket-pieces O to pins L and through the latter to the pulley. While the friction-ring is kept concentric during this operation by the flange C, it is permitted to move inwardly and outwardly during the clutching operation to accommodate any irregularities in the shoes and is thus able by the time the parts are firmly locked together to assume a position between the shoes which will give substantially even driving tension at all points of the ring, so that no part of the latter or of the clutch-rings shall carry an undue proportion of the driving strain.

It will be seen that my invention provides improvements which can be readily and advantageously availed of, and which enable the construction of a clutch which shall be extremely light and strong, very compact, and inexpensive of manufacture. The employment of plate metal for the parts C, D, E, and F, and the pressing of these parts into shape is an important improvement. It enables the construction of all these parts with such uniformity that any part can be interchanged with another like part when required, avoids the necessity of dressing any of the parts, and attains the greatest strength with the least amount of metal. Interchangeability for the links, brackets, and pins is also secured by forming these as drop-forgings or blanked-out bars.

The construction of the friction-ring D with the outward and inward bends, which are essentially annular corrugations beyond its flat friction-face, gives great strength and rigidity to this ring, while the arrangement of these bends so as to present a groove opposite the pins L provides an excellent opportunity for locating the socket-pieces O for engaging the pins. The shape of the flange C, with its cylindrical middle outwardly-bent outer edge and inwardly-bent flat inner edge, gives great strength and rigidity for this portion of the clutch.

Making the clutch-rings E and F with their bends $y$ and $e'$ alike has the advantage that the bends of both of these rings can be formed in the same dies and that the shoes $a$ can be alike and used for both rings. Drawing the middle portion of the ring E into a cylindrical guide Q, of less diameter than the adjacent inner side of the bend $y$ and coinciding with the inner diameter of the ring F, not only makes an excellent guiding and carrying portion for the latter ring but also greatly stiffens and strengthens the ring E in carrying it back from the outer hub to the inner side of the friction-ring. The hub portion $c'$ of the ring E may be annularly corrugated or bent, as shown, between the hub and the cylindrical portion, if great strength is desired, but this is not necessary in all cases.

The employment of braces N is desirable and convenient in most cases, both for reinforcing the fixed ring and for connecting the link J at one point and providing a non-rotative connection between the fixed and movable rings, but the use of these braces is not always essential and, if desired, they may be dispensed with when the ring E is made sufficiently strong, and any suitable means for connecting the links and for preventing relative rotation of the rings may be substituted.

It will be understood that my invention is not limited to the particular details of construction, arrangement, and use set forth and shown as constituting its preferred form, and that it can be adopted according to such modifications, in whole or in part, as circumstances and the judgment of those skilled in the art may dictate, without departing from the spirit of the invention.

What I claim is, in friction-clutches and other devices, the following-defined novel features and combinations, substantially as and for the purpose hereinbefore set forth, namely:

1. A driving and a driven part, and clutch members between said parts consisting of a laterally-moving friction-ring carried by the one and clutching-rings carried by the other, in combination with a separate flange C, having an inner cylindrical guiding portion P receiving and guiding said friction-ring, and an inturned flange $i$ fixed to the part carrying said ring.

2. Driving and driven members, a laterally-moving friction-ring carried by one of said members and clutch-rings carried by the other, in combination with a flange C consisting of a ring of pressed plate metal having a cylindrical portion receiving and movably holding said friction-ring, and rigidly connected inwardly of the latter to the member carrying said friction-ring.

3. A shaft and a pulley, and clutch members between said parts consisting of a friction-ring connected to the pulley and clutch-rings carried by the shaft, in combination with a separate and detachable flange C carried by the pulley and receiving and guiding said friction-ring, and pins L separately connected to the pulley at their inner ends and rigidly connected to said flange near their outer ends, each having a head $k$ within said flange and engaging said friction-ring and preventing rotation of the latter relatively to the pulley, and a transverse radial pin connected and fixed to said head and flange between said pulley and ring.

4. A driving and a driven part, in combination with clutch-rings carried by the one part, and a friction-ring carried by the other part and consisting of a metal ring of pressed plate metal having an inner friction portion between said clutch-rings and an annular concentric groove on its inner side beyond said portion, and an outer concentric bearing edge beyond said groove, an annular flange loosely embracing the bearing portion of said ring, and a connection between said friction-ring and the part carrying it opposite said groove.

5. A driving and a driven part, and clutch-rings carried by the one, in combination with a friction-ring carried by the other and consisting of a ring of pressed metal having an inner flat friction portion $q$ and an outer laterally-bent cylindrical portion $t$, a flange on the part carrying said friction-ring having a cylindrical wall receiving and engaging said portion $t$, and interlocking portions on said part and friction-ring preventing their relative rotation.

6. A driving and a driven part, and clutch-rings carried by one of said parts, in combination with the friction-ring D carried by the other of said parts, and having an inner friction portion $q$ between said rings, outward bend $r$ beyond the latter, and bend $s$ at its outer side, having pieces O within the concave side of said bend $s$, and projections L fixed to the part carrying said friction-ring, engaging said pieces O, and preventing independent rotation of said ring.

7. A driving and a driven part, and a friction-ring and a hub carried by one of said parts, in combination with fixed and movable clutch-rings carried by the other of said parts at and for engaging the opposite faces of said friction-ring, said fixed ring consisting of an annular piece of pressed plate metal and a metal hub fixed together, said ring of plate metal having an annular bend $y$ at the inner side of said friction-ring and an intermediate outwardly-extending hollow body crossing through said friction-ring, parallel with the axis of rotation of said parts, and fixed to said hub at the outer side of said friction-ring, surrounding the hub of the part carrying the latter, and having a tubular guiding portion at the outer side of said friction-ring fitting and guiding said movable ring, a shoe $a$ in said bend $y$, and mechanism connecting said movable and fixed rings and moving them into and out of engagement with said friction-ring.

8. A driving and a driven part, and a friction-ring carried by one of said parts, in combination with fixed and movable clutch-rings at the opposite sides of said friction-ring and carried by the other part, said fixed ring having a friction-shoe at the inner side of said friction-ring and a cylindrical guide extending beyond the outer side of said friction-ring, and said movable ring fitting and sliding on said guide, and a connection between said fixed and movable rings for moving the latter on the former.

9. A driving and a driven part, and a friction-ring carried by one of said parts, in combination with fixed and movable clutch-rings carried by the other of said parts and having shoes at the opposite sides of and engaging said friction-ring, said fixed ring consisting of a piece of pressed plate metal and a metal hub carrying said piece, said piece having an outward bend $y$ opposite the inner face of said friction-ring, a flat portion $c'$ connected to said hub, and an intervening hollow portion having annular face Q, fitting in and guiding the movable ring between said hub and said portion $y$ said movable ring sliding on said face Q, and mechanism for moving said movable ring connected thereto outwardly of said face Q and connected to said fixed ring inwardly of said face.

10. A driving and a driven part, and a friction-ring carried by one of said parts, in combination with fixed and movable clutch-rings at the opposite sides of said friction-ring, engaging the latter and carried by the other of said parts, said fixed ring consisting of a cup-shaped ring of thin pressed metal having outturned edge at the inner side of said friction-ring, an outwardly-extending body crossing said friction-ring and an inturned outer end, and a metal hub fixed to said outer end, braces fixed to the inner side of said body, and friction-shoes carried by the outturned edge of said ring, said movable ring consisting of an annular grooved plate-metal ring surrounding said fixed ring and having shoes opposite those of the latter, and mechanism connecting said fixed and movable rings and operating the latter.

11. A friction-clutch for application to a driving and a driven part, comprising a separate flange having a hollow socket and means for detachably connecting it to one part, in combination with a friction-ring carried non-rotatively in the socket of said flange and freely movable laterally therein, a fixed clutch-ring having means for detachably fastening it to the other part and consisting of an annular pressed plate-metal member having a friction-face at the inner side of said friction-ring, a hollow body parallel with the axis of rotation of said parts, having an outer guiding-face, an inner socket, and an inwardly-extending portion beyond said face, a movable clutch-ring within said flange fitting and sliding on said guiding-face against the outer side of said friction-ring, and mechanism connecting said clutch-rings together and moving one relatively to the other, fixed to the fixed ring inwardly of said guiding-face, and engaging the movable ring.

12. A driving and a driven part, and a friction-ring carried by one of said parts, in combination with fixed and movable clutch-rings carried by the other part, disposed at opposite sides of said friction-ring for embracing the latter, and mechanism for moving said movable ring consisting of a link pivotally connected to said fixed ring and extending outwardly, and a link pivotally connected to said movable ring at one end and pivoted to said first-mentioned link at its other end, and means engaging the united ends of said links and tilting them outwardly and inwardly to move the movable ring toward and from the fixed ring.

13. A driving and a driven part, and a friction-ring carried by one of said parts, and fixed and movable clutch-rings carried by the other of said parts and engaging said friction-ring, in combination with a tension-link pivoted to said fixed ring and extending outwardly, a compression and adjustable link pivoted to said movable ring at one end and at its other end united to the outer end of said tension-link, and means engaging the united ends of said links and swinging them outwardly and inwardly to move the movable ring toward and from the fixed ring.

14. In clutches, a fixed clutch-ring and a movable clutch-ring in combination with links pivoted together and to said parts for moving the latter ring, said fixed clutch-ring having an eye $a'$ and apertures $b'$ at sides of said eye, and one of said links having a bifurcated outer end passing outwardly through said apertures and embracing the sides of said eye, a pin $l'$ pivoting said link to said eye, and the other of said links pivoted to said movable ring at one end and passing within and pivoted to the bifurcated end of said link at the other end.

15. For friction-clutches, a fixed ring E having braces N, and a movable ring F having brackets R and S, in combination with links J and K, pivoted to each other at one end and respectively to said braces and brackets R at their other ends, and lugs $j'$ on said brackets S engaging said braces N.

In witness whereof I have hereunto signed my name in the presence of two subscribing witnesses.

FRANK M. LEAVITT.

Witnesses:
WILLARD P. SCHENCK,
JOSEPH H. WINZLER.